United States Patent
Hendry et al.

(10) Patent No.: US 9,807,419 B2
(45) Date of Patent: Oct. 31, 2017

(54) RECOVERY POINT SEI MESSAGE IN MULTI-LAYER VIDEO CODECS

(71) Applicant: QUALCOMM Incorporated, San Diego, CA (US)

(72) Inventors: Fnu Hendry, Poway, CA (US); Adarsh Krishnan Ramasubramonian, San Diego, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 14/749,577

(22) Filed: Jun. 24, 2015

(65) Prior Publication Data

US 2015/0382018 A1    Dec. 31, 2015

Related U.S. Application Data

(60) Provisional application No. 62/017,238, filed on Jun. 25, 2014.

(51) Int. Cl.
| | |
|---|---|
| *H04N 19/70* | (2014.01) |
| *H04N 19/30* | (2014.01) |
| *H04N 19/46* | (2014.01) |
| *H04N 19/597* | (2014.01) |
| *H04N 19/593* | (2014.01) |
| *H04N 19/184* | (2014.01) |
| *H04N 19/187* | (2014.01) |
| *H04N 19/573* | (2014.01) |

(52) U.S. Cl.
CPC ........ *H04N 19/593* (2014.11); *H04N 19/184* (2014.11); *H04N 19/187* (2014.11); *H04N 19/30* (2014.11); *H04N 19/46* (2014.11); *H04N 19/573* (2014.11); *H04N 19/597* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2008/0267287 A1* | 10/2008 | Hannuksela | H04N 21/4384 375/240.12 |
| 2013/0057441 A1* | 3/2013 | Brown | H01Q 1/48 343/749 |
| 2016/0014419 A1* | 1/2016 | Bordes | H04N 19/30 375/240.24 |

(Continued)

OTHER PUBLICATIONS

International Preliminary Report on Patentability from International Application No. PCT/US2015/037790, dated Aug. 26, 2016, 9 pp.

(Continued)

*Primary Examiner* — Reza Aghevli

(57) ABSTRACT

A device for video encoding multi-layer video data includes a memory configured to store at least a portion of a multi-layer bitstream of video data and one or more processors configured to: encode a first access unit comprising at least a layer and a reference layer of the layer; determine if the first access unit is a recovery point; in response to the first access unit being a recovery point, include in the first access unit, a recovery point SEI message that applies to at least the layer and the reference layer; and generate the first access unit with the SEI message.

28 Claims, 8 Drawing Sheets

(56) References Cited

U.S. PATENT DOCUMENTS

| | | | |
|---|---|---|---|
| 2016/0050424 A1* | 2/2016 | Choi | H04N 19/70 |
| | | | 375/240.12 |
| 2016/0065983 A1* | 3/2016 | Choi | H04N 19/70 |
| | | | 375/240.12 |
| 2016/0156914 A1* | 6/2016 | Suehring | H04N 19/70 |
| | | | 375/240.12 |
| 2016/0323590 A1* | 11/2016 | Li | H04N 19/70 |
| 2016/0337657 A1* | 11/2016 | Choi | H04N 19/50 |
| 2016/0353115 A1* | 12/2016 | Samuelsson | H04N 19/597 |
| 2017/0013259 A1* | 1/2017 | Li | H04N 19/597 |

OTHER PUBLICATIONS

Second Written Opinion from International Application No. PCT/US2015/037790, dated Jun. 16, 2016, 8 pp.

Response to Second Written Opinion dated Jun. 16, 2016, from International Application No. PCT/US2015/037790, filed on Aug. 16, 2016, 34 pp.

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (For FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Hendry, et al., "MV-HEVC/SHVC HLS: More miscellaneous cleanups", JCT-VC Meeting; Jun. 30-Jul. 9, 2014; Sapporo; (Joint Collaborative Team on Video Coding of ISO/IEC JTC1/SC29/WG11 and ITU T SG.16 ); URL: http://wftp3.itu.int/av-arch/jctvc-site/, No. JCTVC-R0279, Jun. 26, 2014, XP030116592, 5 pp.

Hendry, et al., "MV-HEVC/SHVC HLS: On picture order count", JCT-VC Meeting; Jan. 9-17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P0041-v6, Jan. 2, 2014, XP030115502, 12 pp.

Sullivan, et al., "Meeting Report of 18th JCT-VC Meeting", JCT-VC Meeting; Jun. 30-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/,, No. JCTVC-R1000, Oct. 17, 2014, XP030116688, 199 pp.

Wang, et al., "MV-HEVC/SHVC HLS: SEI Message Cleanups", JCT-VC Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0183, Mar. 25, 2014, XP030116133, 6 pp.

Chen, et al., "High efficiency video coding (HEVC) scalable extensions Draft 5," JCT-VC Meeting; Jan. 9-17, 2014, (Joint Collaborative Team on Video Coding of ISO/IEC JTC1/SC29/WG11 and ITU-T SG.16); No. JCTVC-P1008_v4, Jan. 22, 2014; 125 pp.

Tech, et al., "MV-HEVC Draft Text 7," JCT-VC Meeting; Jan. 11-17, 2014, JCT-VC Meeting; Jan. 11-17, 2014, (Joint Collaborative Team on Video Coding of ISO/IEC JTC1/SC29/WG11 and ITU-T SG.16); No. JCT3V-G1004_v7, 131 pp.

Wang, et al., "High Efficiency Video Coding (HEVC) Defect Report 4," JCT-VC Meeting; Mar. 27-Apr. 4, 2014, (Joint Collaborative Team on Video Coding of ISO/IEC JTC1/SC29/WG11 and ITU-T SG.16); No. JCTVC-Q1003_v1, May 28, 2014; 314 pp.

Tech, et al., "MV-HEVC Draft Text 8," JCT-VC Meeting; Mar. 29-Apr. 4, 2014; (Joint Collaborative Team on Video Coding of ISO/IEC JTC1/SC29/WG11 and ITU-T SG.16); No. JCT3V-H1002_v5, Jun. 3, 2014; 164 pp.

Chen, et al., "Preliminary version of High efficiency video coding (HEVC) scalable extension Draft 6," JCT-VC Meeting; Mar. 27-Apr. 4, 2014; (Joint Collaborative Team on Video Coding of ISO/IEC JTC1/SC29/WG11 and ITU-T SG.16); No. JCTVC-Q1008_v2, 160 pp.

ITU-T H.223, Series H: Audiovisual and Multimedia Systems, Infrastructure of audiovisual services—Transmission multiplexing and synchronization, Multiplexing protocol for low bit rate multimedia communication, The International Telecommunication Union. Jul. 2001, 74 pp.

International Search Report and Written Opinion from International Application No. PCT/US2015/037790, dated Sep. 28, 2015, 12 pp.

Response to Written Opinion from International Application No. PCT/US2015/037790, filed on Apr. 25, 2016, 4 pp.

* cited by examiner the entire content of which is incorporated herein by reference.
RECOVERY POINT SEI MESSAGE IN MULTI-LAYER VIDEO CODECS This Application claims the benefit of U.S. Provisional Application 62/017,238, filed 25 Jun. 2014, the entire content of which is incorporated herein by reference.

TECHNICAL FIELD

This disclosure relates to video coding and compression and signaling of data associated with compressed video in a bitstream.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure relates to multi view video coding and, more specifically, to the inclusion of recovery point SEI messages in multi layer video.

In one example, a method of encoding video data includes encoding a first access unit comprising at least a layer and a reference layer of the layer; determining if the first access unit is a recovery point; in response to the first access unit being a recovery point, including in the first access unit, a recovery point SEI message that applies to at least the layer and the reference layer; and generating the first access unit with the SEI message.

In another example, a device for video encoding multi-layer video data includes a memory configured to store at least a portion of a multi-layer bitstream of video data and one or more processors configured to encode a first access unit comprising at least a layer and a reference layer of the layer; determine if the first access unit is a recovery point; in response to the first access unit being a recovery point, include in the first access unit, a recovery point SEI message that applies to at least the layer and the reference layer; and generate the first access unit with the SEI message.

In another example, a computer readable storage medium storing instructions that when executed by one or more processors cause the one or more processor to encode a first access unit comprising at least a layer and a reference layer of the layer; determine if the first access unit is a recovery point; in response to the first access unit being a recovery point, include in the first access unit, a recovery point SEI message that applies to at least the layer and the reference layer; and generate the first access unit with the SEI message.

In another example, an apparatus for encoding video data includes means for encoding a first access unit comprising at least a layer and a reference layer of the layer; means for determining if the first access unit is a recovery point; means for including in the first access unit, a recovery point SEI message that applies to at least the layer and the reference layer in response to the first access unit being a recovery point; and means for generating the first access unit with the SEI message.

The details of one or more examples of the disclosure are set forth in the accompanying drawings and the description below. Other features, objects, and advantages will be apparent from the description, drawings, and claims.

DETAILED DESCRIPTION

Figure 1:
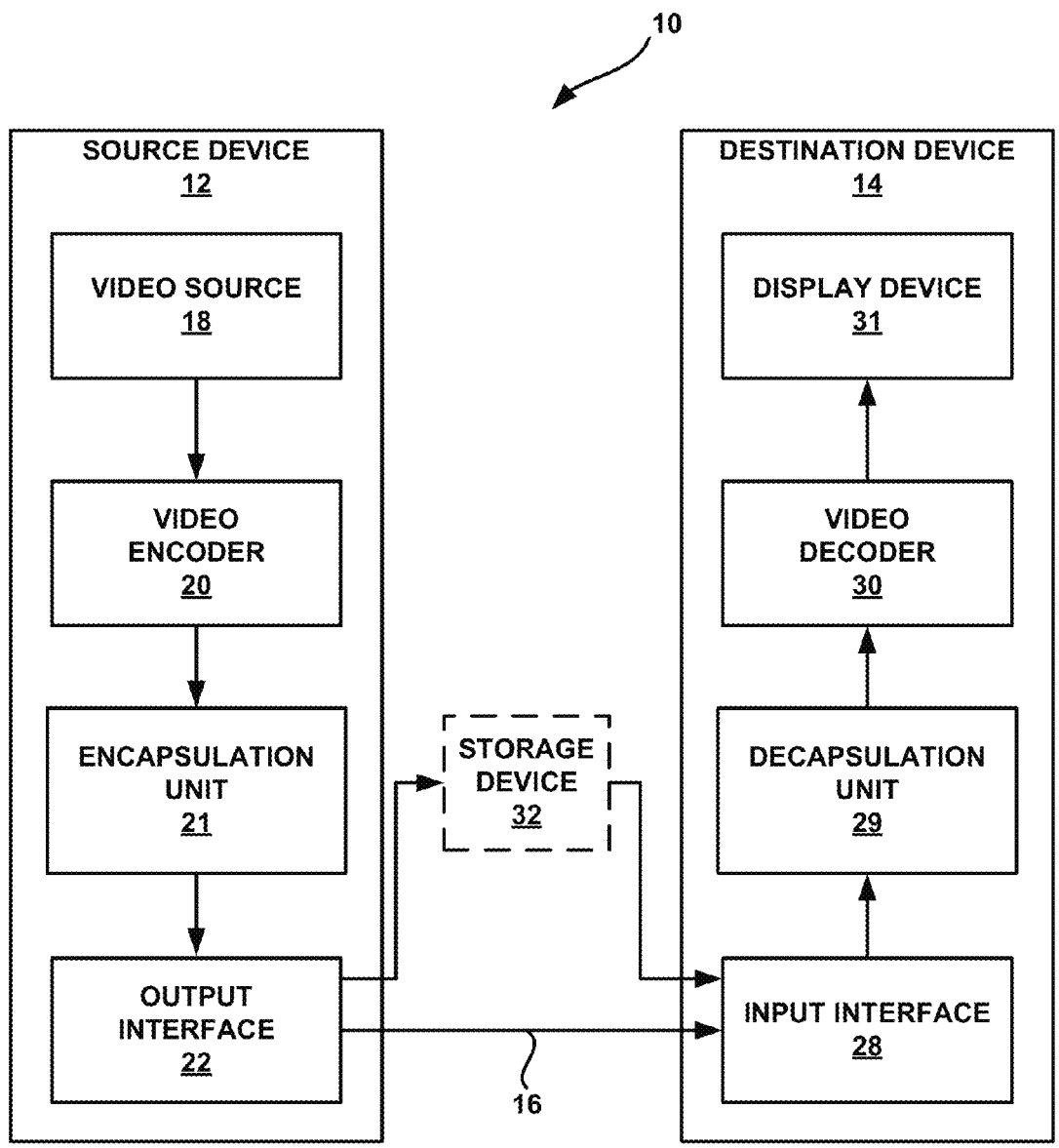
FIG. 1 is a block diagram illustrating an example video encoding and decoding system that may utilize the techniques described in this disclosure.

This disclosure includes techniques for applying supplemental enhancement information (SEI) messages that are defined in the High Efficiency Video Coding (HEVC) standard in a multi-layer context. In some instances, the techniques may be performed with multi-layer extensions to the HEVC standard such as a Multi-view Video Coding extension to HEVC (MV-HEVC) or a Scalable Video Coding (SVC) extension to HEVC (SHVC), as noted below. While the techniques of this disclosure will generally be described using HEVC terminology, the techniques of this disclosure are not necessarily limited to any particular video coding standard, and may additionally or alternatively be used with other extensions to HEVC, other multi-view coding standards, and/or other multi-layer video coding standards. Additionally, unless stated otherwise, it should be assumed that the techniques of this disclosure, as described below, may be applied independently or in combination.

A "layer" of video data may generally refer to a sequence of pictures having at least one common characteristic, such as a view, a frame rate, a resolution, or the like. For example, a layer may include video data associated with a particular view (e.g., perspective) of multi-view video data. As another example, a layer may include video data associated with a particular layer of scalable video data. Thus, this disclosure may interchangeably refer to a layer and a view of video data. That is, a view of video data may be referred to as a layer of video data, and vice versa, and a plurality of views or a plurality of scalable layers may be referred to, in a similar manner, as multiple layers, e.g., in a multi-layer coding system. In addition, a multi-layer codec (also referred to as a multi-layer video coder or multi-layer encoder-decoder) may refer to a multi-view codec or a scalable codec (e.g., a codec configured to encode and/or decode video data using MV-HEVC, SHVC, or another multi-layer coding technique).

The HEVC standard generally defines a layer as a set of network abstraction layer (NAL) units that all have a particular value of nuh_layer_id and the associated non-video coding layer (VCL) NAL units, or one of a set of syntactical structures having a hierarchical relationship. The HEVC standard generally defines a NAL unit as a syntax structure containing an indication of the type of data included in the NAL unit and bytes containing that data in the form of an raw byte sequence payload (RBSP). The syntax element "nuh_layer_id" identfies the layer to which the NAL units belong.

A multi-layer bitstream may include a base layer and one or more non-base layers, e.g., in SHVC, or a plurality of views, e.g., in MV-HEVC. In a scalable bitstream, the base layer may typically have a layer identifier (e.g. nuh_layer_id) that is equal to zero. A non-base layer may have a layer identifier that is greater than zero and may provide additional video data that is not included in the base layer. For example, a non-base layer of multi-view video data may include an additional view of video data. A non-base layer of scalable video data may include an additional layer of scalable video data. A non-base layer may be interchangeably referred to as an enhancement layer.

An access unit (sometimes abbreviated as AU) of a multi-layer bitstream is, generally, a unit of data including all layer components (e.g., all NAL units) for a common temporal instance. The layer components of an access unit are typically intended to be output together (i.e., output substantially simultaneously), where outputting a picture generally involves transferring pictures from a decoded picture buffer (DPB) (e.g., storing pictures from the DPB to an external memory, sending the pictures from the DPB to a display, or the like). The HEVC standard generally defines an access unit as a set of NAL units that are associated with each other according to a specified classification rule, are consecutive in decoding order, and contain exactly one coded picture. In addition to containing the VCL NAL units of the coded picture, an access unit may also contain non-VCL NAL units. The decoding of an access unit results in a decoded picture.

A bitstream containing an encoded representation of video data may include a series of NAL units. The NAL units may include VCL NAL units and non-VCL NAL units. The VCL NAL units may include coded slices of pictures. A non-VCL NAL unit may, for example, encapsulate other information, such as a video parameter set (VPS), a sequence parameter set (SPS), a picture parameter set (PPS), one or more SEI messages, or other types of data.

NAL units of the bitstream may be associated with different layers of the bitstream. In SHVC, as noted above, the layers other than a base layer may be referred to as "enhancement layers" and may include data that improve the quality of playback of the video data. In multi-view coding and three-dimensional video (3DV) coding, such as MV-HEVC, the layers may include data associated with different views. Each layer of the bitstream is associated with a different layer identifier.

In addition, NAL units may include temporal identifiers. Each operation point of a bitstream has a set of layer identifiers and a temporal identifier. If a NAL unit specifies a layer identifier in the set of layer identifiers for an operation point and the temporal identifier of the NAL unit is less than or equal to the temporal identifier of the operation point, the NAL unit is associated with the operation point.

The SEI mechanism supported in both H.264/AVC and HEVC enables video encoders to include metadata in the bitstream that is not required for correct decoding, by a video decoder or other device, of the sample values of the output pictures, but can be used for various other purposes, such as picture output timing, displaying, as well as loss detection and concealment. A NAL unit that encapsulates one or more SEI messages is referred to herein as a SEI NAL unit. One type of SEI message is a scalable nesting SEI message. A scalable nesting SEI message is an SEI message that contains one or more additional SEI messages. The scalable nesting SEI message may be used to indicate whether an SEI message applies to particular layers or temporal sub-layers of a multi-layer bitstream. An SEI message that is not contained in a scalable nesting SEI message is referred to herein as a non-nested SEI message.

Certain types of SEI messages contain information that is only applicable to particular operation points. An operation point of a bitstream is associated with a set of layer identifiers and a temporal identifier. An operation point representation may include each NAL unit that is associated with an operation point. An operation point representation may have a different frame rate and/or bit rate than an original bitstream. This is because the operation point representation may not include some pictures and/or some of the data of the original bitstream.

Bitstreams of encoded video data are encoded to include recovery points. The HEVC standard generally defines a recovery point as a point in the bitstream at which the recovery of an exact or an approximate representation of the decoded pictures represented by the bitstream may be achieved after a random access or broken link. Random access refers to the act of starting the decoding process for a bitstream at a point other than the beginning of the stream, and a broken link refers to a location in a bitstream at which it is indicated that some subsequent pictures in decoding order may contain serious visual artifacts due to unspecified operations performed in the generation of the bitstream.

To implement recovery points, a video encoder generates recovery point SEI messages. In HEVC, the recovery point SEI message assists a decoder in determining when the decoding process will produce acceptable pictures for display after the decoder initiates random access or after the encoder indicates a broken link in the coded video sequence (CVS). When the decoding process is started with the access unit in decoding order associated with the recovery point SEI message, all decoded pictures at or subsequent to the recovery point in output order specified in this SEI message are indicated to be correct or approximately correct in content. Decoded pictures produced by random access at or before the picture associated with the recovery point SEI message need not be correct in content until the indicated recovery point, and the operation of the decoding process starting at the picture associated with the recovery point SEI message may contain references to pictures unavailable in the decoded picture buffer.

In HEVC and other video coding standards, the order in which picture are output may not necessarilly be the same as the order in which the pictures are decoded. In other words, a first picture may be received in the bitstream before a second picture, but the second picture may actually be output before the first picture. So that a video decoder may manage the the output order of decoded pictures, decoded pictures have an associated picture order count (POC) value. The POC of a picture is a variable that is associated with each picture, uniquely identifies the associated picture among all pictures in the coded video sequence, and indicates the position of the associated picture in output order relative to the output order positions of the other pictures in the same coded video sequence (CVS).

Existing techniques for implementing recovery point SEI messages into a coded video sequence potentially create problems when decoding of the coded video sequence begins at the recovery point. As will be explained in more detail below, in order to reduce signalling overhead, the full POC values of pictures in an access unit are not always signalled but instead may be inferred. Under some coding scenarios, however, these techniques for inferring POC values can cause an inconsistency between inferred POC values and expected POC values. This inconsistency may, for instance, cause a video decoder to assume that a picture has been lost, when in actuality the picture instead has a POC value different than the POC value expected by the video decoder.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, wireless/cellular telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication. In some implementations, source device 12 and destination device 14 may be mobile network devices configured to communicate over a mobile network.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. The communication medium may also form part of a cellular or mobile network, and source device 12 and destination device 14 may be configured to communicate using a mobile, sometimes referred to as a cellular, communication standard such as a GSM network, CDMA network, LTE network, or other such network.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20, encapsulation unit 21, and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. Encapsulation unit 21 may form one or more representations of the multimedia content, where each of the representations may include one or more layers. In some examples, video encoder 20 may encode each layer in different ways, e.g., with different frame rates, different bit rates, different resolutions, or other such differences. Thus, encapsulation unit 21 may form various representations having various characteristics, e.g., bit rate, frame rate, resolution, and the like.

Each of the representations may correspond to respective bitstreams that can be retrieved by destination device 14. Encapsulation unit 21 may provide an indication of a range of view identifiers (view_ids) for views included in each representation, e.g., within a media presentation description (MPD) data structure for the multimedia content. For example, encapsulation unit 21 may provide an indication of a maximum view identifier and a minimum view identifier for the views of a representation. The MPD may further provide indications of maximum numbers of views targeted for output for each of a plurality of representations of the multimedia content. The MPD or data thereof may, in some examples, be stored in a manifest for the representation(s).

The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, decapsulation unit 29, a video decoder 30, and a display device 31. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Decapsulation unit 29 of destination device 14 may represent a unit that decapsulates SEI messages from a bitstream (or a subset of a bitstream, referred to as an operation point in the context of multi-layer coding). Decapsulation unit 29 may perform operations in an order opposite to those performed by encapsulation unit 21 to decapsulate data from the encapsulated encoded bitstream, such as SEI messages.

Display device 31 may be integrated with, or external to, destination device 14. In some examples, destination device 14 may include an integrated display device and also be configured to interface with an external display device. In other examples, destination device 14 may be a display device. In general, display device 31 displays the decoded video data to a user, and may comprise any of a variety of display devices such as a liquid crystal display (LCD), a plasma display, an organic light emitting diode (OLED) display, or another type of display device.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In other examples, video encoder 20 and video decoder 30 may operate according to ITU-T H.265 (HEVC) Series H: Audiovisual and Multimedia Systems, Infrastructure of audiovisual services—Coding of moving video, High efficiency video coding, The International Telecommunication Union, October 2014, developed by the Joint Collaboration Team on Video Coding (JCT-VC) of ITU-T Video Coding Experts Group (VCEG) and ISO/IEC Motion Picture Experts Group (MPEG).

Furthermore, there are ongoing efforts to produce scalable video coding, multi-view coding, and 3DV extensions for HEVC. The scalable video coding extension of HEVC may be referred to as SHVC. A Working Draft (WD) of SHVC (referred to as SHVC WD5 or the current SHVC WD hereinafter), is described in Chen et al., "High Efficiency Video Coding (HEVC) scalable extension draft 5," Joint Collaborative Team on Video Coding (JCT-VC) of ITU-T SG16 WP3 and ISO/IEC JTC1/SC29/WG11, document JCTVC-P1008_v4, 16$^{th}$ Meeting, San Jose, January 2014. A Working Draft (WD) of MV-HEVC (referred to as MV-HEVC WD7 or the current MV-HEVC WD hereinafter) is described in Tech et al., "MV-HEVC Draft Text 7," Joint Collaborative Team on Video Coding (JCT-VC) of ITU-T SG16 WP3 and ISO/IEC JTC1/SC29/WG11, document JCTVC-G1004_v7, 16$^{th}$ Meeting, San Jose, January 2014.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an NxN block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of NAL units. A NAL unit is a syntax structure containing an indication of the type of data in the NAL unit and bytes containing that data in the form of a RBSP interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In multi-view coding, there may be multiple views of the same scene from different viewpoints. As noted above, an access unit includes a set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier. Example types of view components include texture view components and depth view components.

Multi-view coding supports inter-view prediction. Inter-view prediction is similar to the inter prediction used in HEVC and may use the same syntax elements. However, when a video coder performs inter-view prediction on a current video unit (such as a PU), video encoder 20 may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

The SEI mechanism supported in both H.264/AVC and HEVC enables video encoders (e.g., video encoder 20) to include such metadata in the bitstream that is not required for correct decoding of the sample values of the output pictures, but can be used for various other purposes, such as picture output timing, displaying, as well as loss detection and concealment. Video encoder 20 may use SEI messages to include, in the bitstream, metadata that is not required for correct decoding of the sample values of pictures. However, video decoder 30 or other devices may use the metadata included in SEI messages for various other purposes. For example, video decoder 30 or another device may use the metadata in SEI messages for picture output timing, picture displaying, loss detection, and error concealment.

Video encoder 20 may generate one or more SEI NAL units for inclusion in an access unit. In other words, any number of SEI NAL units may be associated with an access unit. Furthermore, each SEI NAL unit may contain one or more SEI messages. That is, video encoders can include any number of SEI NAL units in an access unit, and each SEI NAL unit may contain one or more SEI messages. A SEI NAL unit may include a NAL unit header and a payload. The NAL unit header of the SEI NAL unit includes at least a first syntax element and a second syntax element. The first syntax element specifies a layer identifier of the SEI NAL unit. The second syntax element specifies a temporal identifier of the SEI NAL unit.

A nested SEI message refers to an SEI message that is contained in a scalable nesting SEI message. A non-nested SEI message refers to an SEI message that is not contained in a scalable nesting SEI message. The payload of the SEI NAL unit may comprise a nested SEI message or a non-nested SEI message.

The HEVC standard describes the syntax and semantics for various types of SEI messages. However, the HEVC standard does not describe the handling of the SEI messages because the SEI messages do not affect the normative decoding process. One reason to have SEI messages in the HEVC standard is to enable supplemental data being interpreted identically in different systems using HEVC. Specifications and systems using HEVC may require video encoders to generate certain SEI messages or may define specific handling of particular types of received SEI messages.

Table 1, below, lists SEI messages specified in HEVC and briefly describes their purposes:

TABLE 1

Overview of SEI messages

| SEI message | Purpose |
| --- | --- |
| Buffering period | Initial delays for hypothetical reference decoder (HRD) operation |
| Picture timing | Picture output time and picture/sub-picture removal time for HRD operation, as well as picture structure related information |

TABLE 1-continued

Overview of SEI messages

| SEI message | Purpose |
| --- | --- |
| Pan-scan rectangle | Displaying at a different picture aspect ratio (PAR) than the PAR of the output pictures |
| Filler payload | Adjusting the bitrate to meet specific constraints |
| User data registered User data unregistered | SEI messages to be specified by external entities |
| Recovery point | Additional information for clean random access. Gradual decoding refresh. |
| Scene information | Information about scene changes and transitions |
| Full-frame snapshot | Indication to label the associated decoded picture as a still-image snapshot of the video content |
| Progressive refinement segment | Indicates that certain consecutive pictures represent a progressive refinement of the quality of a picture rather than a moving scene |
| Film grain characteristics | Enables decoders to synthesize film grain |
| Deblocking filter display preference | Recommends whether or not displayed pictures should undergo the in-loop deblocking filter process |
| Post-filter hint | Provides suggested post-filter coefficients or correlation information for post-filter design |
| Tone mapping information | Remapping to another color space than that used or assumed in encoding |
| Frame packing arrangement | Packing of stereoscopic video into an HEVC bitstream |
| Display orientation | Specifies flipping and/or rotation that should be applied to the output pictures when they are displayed |
| Structure of pictures description | Describes the temporal and inter prediction structure of the bitstream |
| Decoded picture hash | Checksum of the decoded picture, which may be used for error detection |
| Active parameter sets | Provides information on of active VPS, SPS, etc. |
| Decoding unit information | Sub-picture removal time for HRD operation, as well as decoding unit index |
| Temporal level zero index | Provides temporal level zero index values |
| Scalable nesting | Provides a mechanism to nest SEI messages for association to different operation points and layers |
| Region refresh information | Provides information on refreshed and non-refreshed region for gradual decoding refresh |

This disclosure introduces techniques related to SEI messages and, more specifically, to recovery point SEI messages. Existing techniques for implementing recovery point SEI messages have some potential shortcomings. For example, when decoding starts at an access unit (auA) that contains a recovery point SEI message that applies to a set of layers (layerIdList), the most significant bits (MSBs) of the picture order count (POC) of the pictures in the layers belonging to layerIdList are inferred to be equal to 0. In some situations, this inferring of the MSBs of the POC to be equal to zero may result in incorrect referencing of POCs of pictures. Video decoder 30 may, for example, start decoding a bitstream at access unit auA due to random access or loss of earlier pictures.

Video decoder 30 calculates a POC based on two components, which are a least significant bits part of the POC (i.e., POC LSB) and a most significant bits part of the POC (i.e., POC MSB). Video decoder 30 receives a POC LSB value in a header for each slice(s) of a picture, whereas POC MSB is not signaled but inferred based on a set of defined rules. For example, in single layer video, the value of POC is set to 0 when the picture is an IDR picture. For multi-layer video, a more complicated set of rules is implemented. When picture types in an AU are not the same (e.g. there is an IRAP picture in one layer but a non-IRAP picture in another layer), it may be probable that a POC reset is needed. There are two types of POC resets, resetting of the POC MSB to 0 and resetting of both POC MSB and POC LSB to 0. The picture where a POC reset is needed is called a POC resetting picture. For this picture, the slice header extension includes signaling for the POC reset (i.e., telling what type of reset, original POC MSB value of the picture, etc). Based on this information, decoder 30 performs the POC reset.

Figure 2:
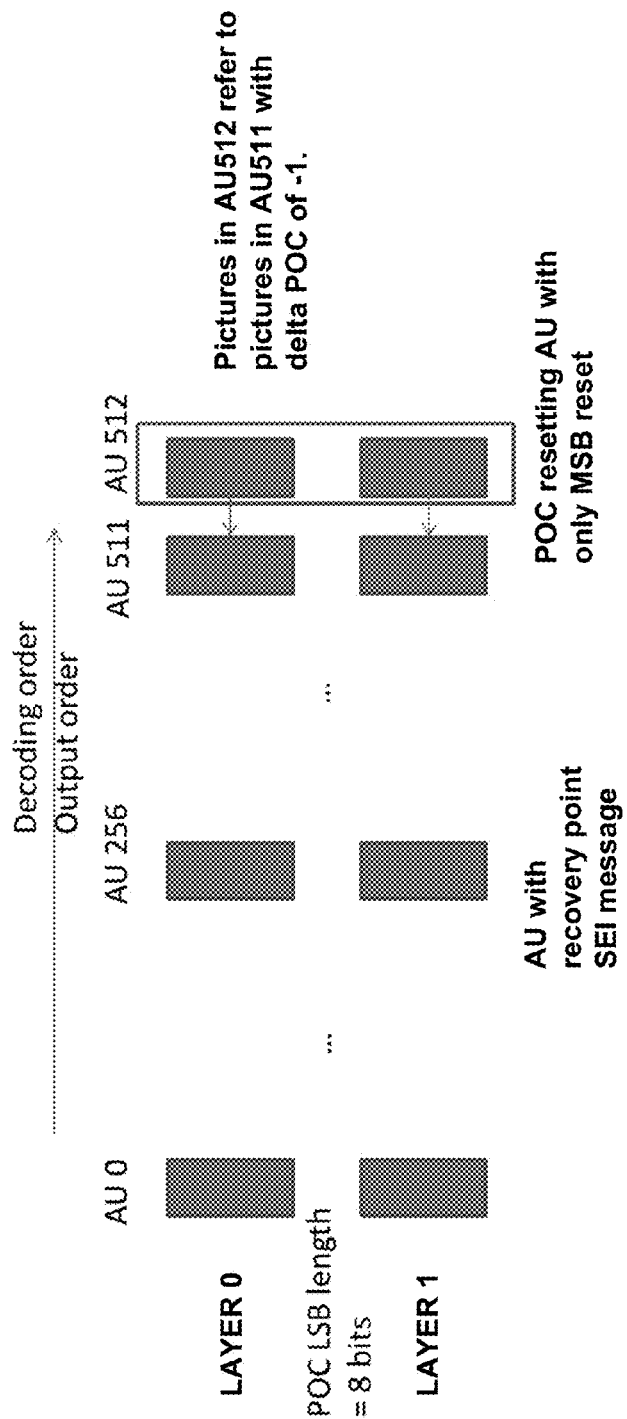
FIG. 2 shows an example of a bitstream that includes a plurality of access units.
Figure 3:
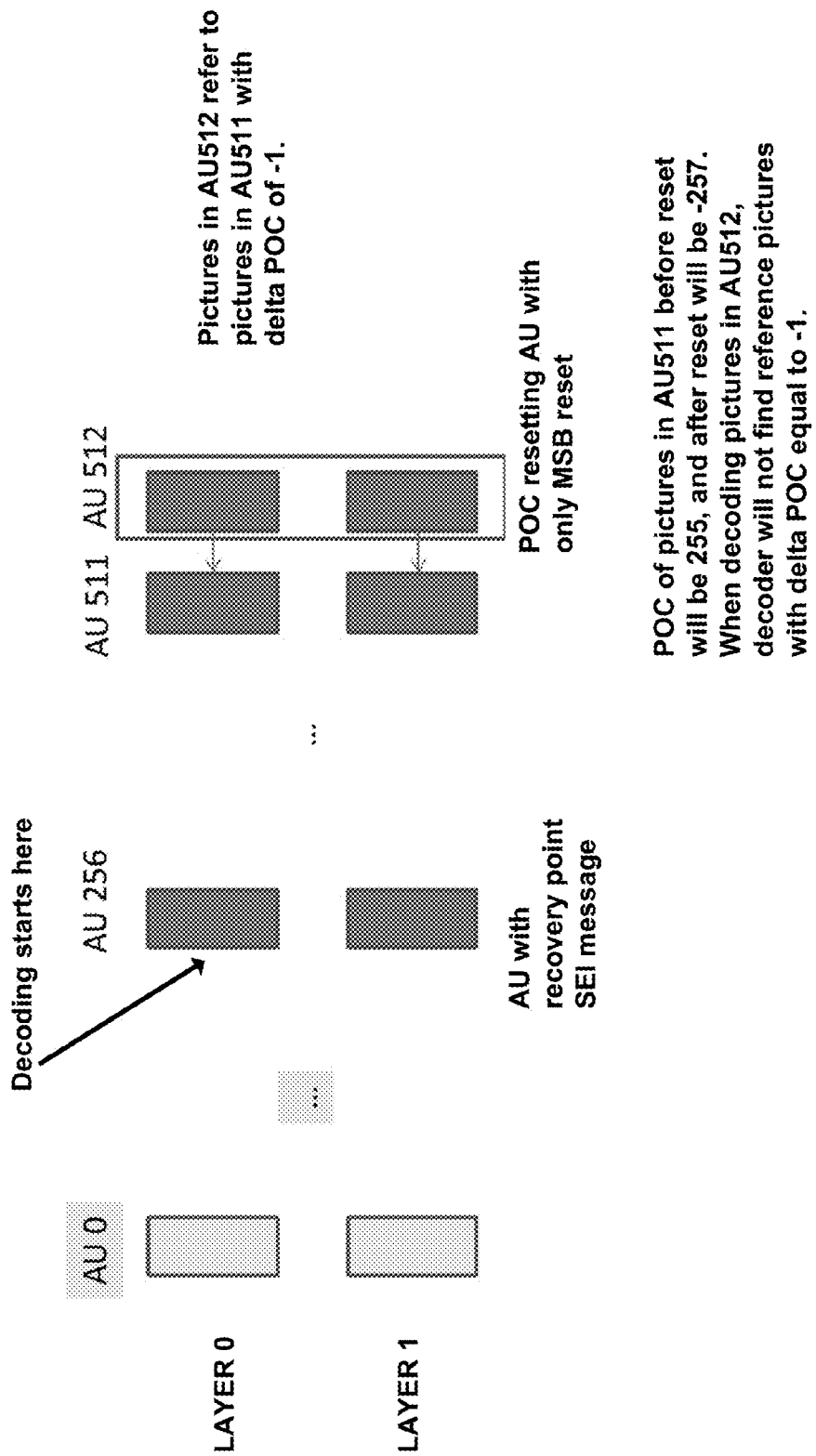
FIG. 3 shows an example of a bitstream that includes a plurality of access units.

FIGS. 2 and 3 show an example of a portion of a bitstream with access units 0 to 512. For simplicity and to ease in explanation, FIGS. 2 and 3 only show AU 0, AU 256, AU 511, and AU 512. The numbers associated with the access units (e.g. 0, 256, 511, and 512) in FIGS. 2 and 3 represent the POC values of the access units in the original bitstream. FIGS. 2 and 3 shows two layers (LAYER 0 and LAYER 1), although it should be understood, that techniques and features described with respect to FIGS. 2 and 3 are also potentially applicable to video data with more than two layers. In the example of FIGS. 2 and 3, AU 256 contains a recovery point SEI message. Additionally, in the example of FIGS. 2 and 3, the MSB of the POCs for pictures in AU 511 are not signaled, but instead may be inferred based on the POC MSB of an anchor picture, which is the preceding picture in decoding order with a temporal ID equal to zero. In the example of FIGS. 2 and 3, AU 512 is a POC resetting AU with only the MSB reset.

A POC resetting AU is an AU with pictures that are POC resetting pictures. A POC resetting picture is a picture in which its POC value is reset. The reset can be of two types, e.g., resetting the POC MSB to 0 and resetting both POC MSB and POC LSB to 0. A POC reset may occur, for example, when at least one IRAP picture is present in the AU and the rest of pictures in the AU are not IRAP.

In the original bitstream of FIG. 2, AU 256 contains a recovery point SEI message that applies to both the layers, and AU 512 is a POC resetting AU. Pictures in AU 512 refer to pictures in AU 511, with a POC difference of −1. This value (−1) is signaled as a delta POC for the reference pictures. The POC MSB values of the pictures in AU 256 are not signaled. When decoding starts at AU 256, decoder 30 derives the POC value of pictures in AU 256 to be equal to 0 (because the signaled LSB would be equal 0). The POC value of pictures in AU 511 would be derived to be equal to 255, and after the POC is reset at AU 512, the updated POC of the pictures in AU 511 have a POC value equal to −257 (255−512). When pictures in AU 512 refer to pictures with a POC difference of −1, the video decoder will not find reference pictures with that POC value because the difference between the POC values of pictures in AU 512 and pictures in AU 511 is now −257. This could trigger the decoder to conclude that pictures may have been lost.

According to a first technique of this disclosure, video encoder 20 may signal the MSB part of the POC of the pictures in the AU containing the recovery point SEI message, when the recovery point SEI message applies to any layer with nuh_layer_id greater than 0. The MSB bits may be signaled in the recovery point SEI message, slice segment header extension, or via external means. Additionally or alternatively, a value may be signaled in the recovery point SEI message to indicate by which means the MSB of the POC of the pictures in the access unit containing the recovery point SEI message are signaled. Additionally or alternatively, the MSB bits of the POC of the pictures in the access unit containing the recovery point SEI message is signaled regardless of the layers to which the recovery point SEI message applies.

According to another technique of this disclosure, video encoder 20 may encode the video data in accordance with a constraint such that recovery point SEI message that applies to at least a layer and its reference layers is not allowed to be present in an access unit (auA) unless (1) auA is a POC resetting AU, or (2) one or more pictures in auA contain POC MSB signaled (e.g., poc_msb_val), or (3) there exists no picture picA (in an access unit that succeeds auA) that satisfies any of the following conditions:

picA precedes, in decoding order, the first of auB (when present), auC (when present), and auD (when present) in decoding order. Thus, when present, picA is present in an access unit between, in decoding order, auA and auB, auC, and auD (i.e., after auA and before auB, auC and auD).

picA belongs to auB or auC when the first of auB (when present), auC (when present), and auD (when present) in decoding order is auB or auC, respectively.

None of auB, auC, and auD exists in the bitstream.

Where auB is the first access unit, when present, that follows auA in decoding order and contains pictures that all are IDR pictures or BLA pictures, auC is the first access unit, when present, that follows auA in decoding order and is the start of a POC resetting period, and auD is the first access unit, when present, that follows auA in decoding order and contains an IRAP picture in the base layer with NoClrasOutputFlag equal to 1. Video encoder 20 may encode a first access (e.g. auA) unit and determine if the first access unit is a recovery point. In response to the first access unit being a recovery point, video encoder 20 may include in the first access unit, a recovery point SEI message that applies to at least a layer and reference layers of the layer. Video encoder 20 may generate the first access unit with the SEI message. Video encoder 20 may additionally or alternatively determine if the first access unit is a picture order count (POC) resetting accessing unit and include the recovery point SEI message that applies to at least the layer and reference layers of the layer in response to the first access unit being the POC resetting access unit. Video encoder 20 may additionally or alternatively determine if the first access unit comprises one or more pictures comprising a POC MSB and include, in the first access unit, the recovery point SEI message that applies to at least the layer and reference layers of the layer in response to the first access unit comprising one or more pictures comprising a POC MSB.

Video encoder 20 may additionally or alternatively determine if there exists a picture (e.g. picA) that precedes a first picture, in decoding order, of a second access unit (e.g., auB), a third access unit (e.g., auC), or a fourth access unit (e.g. auD). In this example, the second access unit includes all IDR pictures or BLA pictures, and the third access unit comprises a first access unit that follows the first access unit in decoding order and is the start of a POC resetting period. The fourth access unit is the first access unit that follows the first access unit in decoding order and contains an IRAP picture in the base layer with NoClrasOutputFlag equal to 1. In response to determining that there exists no picture that precedes the first picture, in decoding order, of the second access unit, the third access unit, or the fourth access unit, video encoder 20 includes, in the first access unit, the recovery point SEI message that applies to at least the layer and the reference layers of the layer.

Additionally or alternatively, video encoder 20 determines if there exists a picture (e.g. picA) that belongs to one of a second access unit (e.g. auB) or a third access unit (e.g. auC). In this example, the one of the second access unit and the third access units precede, in decoding order, a fourth access unit (e.g. auD), and the second access unit includes all IDR pictures or BLA pictures. The third access unit includes a first access unit that follows the first access unit in decoding order and is the start of a POC resetting period, and the fourth access unit is the first access unit that follows the first access unit in decoding order and contains an IRAP picture in the base layer with NoClrasOutputFlag equal to 1. In response to determining that there exists no picture (e.g., picA) that precedes the first picture, in decoding order, of the second access unit (e.g., auB), the third access unit (e.g., auC), or the fourth access unit (e.g., auD), video encoder 20 includes in the first access unit, the recovery point SEI message that applies to at least the layer and the reference layers of the layer.

Stated differently, for a particular access unit auA, let auB be the first access unit that succeeds auA in decoding order such that the POC values of the pictures in auB can be derived without using the POC values of pictures preceding auB in decoding order. For a particular layer layerA, auA is not allowed to contain a recovery point SEI message that applies to a set of layers containing at least layerA and all reference layers of layerA when all of the following conditions are true:

All pictures in auA that are in the reference layers, if any, of layerA have both poc_msb_cycle_val_present_flag and poc_reset_idc equal to 0.

There is at least one picture picA with poc_msb_cycle_val_present_flag equal to 1 in the following access units.

Access units that follow auA in decoding order and precede auB, are present, in decoding order.

Access unit auB is present and picture in auB with nuh_layer_id equal to 0 is not an IRAP picture with NoClrasOutputFlag equal to 1.

The HEVC standard generally defines an instantaneous decoding refresh (IDR) access unit as an access unit in which the coded picture is an IDR picture and generally defines an IDR picture as an IRAP picture for which each VCL NAL unit has nal_unit_type equal to IDR_W_RADL or IDR_N_LP. As explained in the HEVC specification, an IDR picture contains only I slices, and may be the first picture in the bitstream in decoding order, or may appear later in the bitstream. Each IDR picture is the first picture of a CVS in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

The HEVC standard generally defines an intra random access point (IRAP) access unit as an access unit in which the coded picture is an IRAP picture and defines an intra random access point (IRAP) pictureas a coded picture for which each VCL NAL unit has nal_unit_type in the range of BLA_W_LP to RSV_IRAP_VCL23, inclusive. As explained in the HEVC specification, an IRAP picture contains only I slices, and may be a BLA picture, a CRA picture or an IDR picture. The first picture in the bitstream in decoding order must be an IRAP picture. Provided the necessary parameter sets are available when they need to be activated, the IRAP picture and all subsequent non-RASL pictures in decoding order can be correctly decoded without performing the decoding process of any pictures that precede the IRAP picture in decoding order. There may be pictures in a bitstream that contain only I slices that are not IRAP pictures.

In HEVC, when a current picture is an IRAP picture with nuh_layer_id equal to 0 and NoClrasOutputFlag is equal to 1, all reference pictures with any value of nuh_layer_id currently in a decoded picture buffer are marked as "unused for reference." The NoClrasOutputFlag flag indicates if a cross layer includes cross layer random access pictures. As one example, an access unit may include an IRAP in the base layer but include non-IRAP pictures in other layers. Until the video decoder receives an IRAP for a non-base layer, the video decoder does not output the pictures of the non-base layer. The flag NoClrasOutputFlag flag set to 1 indicates cross layer random access pictures are not output.

According to another technique of this disclosure, video encoder 20 may set the MSB of the POC of the current picture to be equal to the MSB of the POC of any other picture in the same access unit when decoding of the pictures in the current layer starts at the current picture.

Alternatively, the MSB of POC of the current picture is derived such that the PicOrderCnt of the current picture is equal to the POC of the other pictures in the same access unit.

According to another technique of this disclosure, video encoder 20 may encode the video data according to a constraint such that when an access unit does not contain a picture at a layer layerA, the access unit shall not contain a nested or non-nested recovery point SEI message that applies to layerA.

According to another technique of this disclosure, video encoder 20 may encode the video data according to a constraint such that, when poc_msb_val is not signaled in the current access unit but is signaled for any picture that follows an access unit auA in decoding order and precedes the first access unit that follows auA and contains an IRAP picture in the base layer with NoClrasOutputFlag equal to 1, auA shall not contain a nested or non-nested recovery point SEI message.

Figure 4:
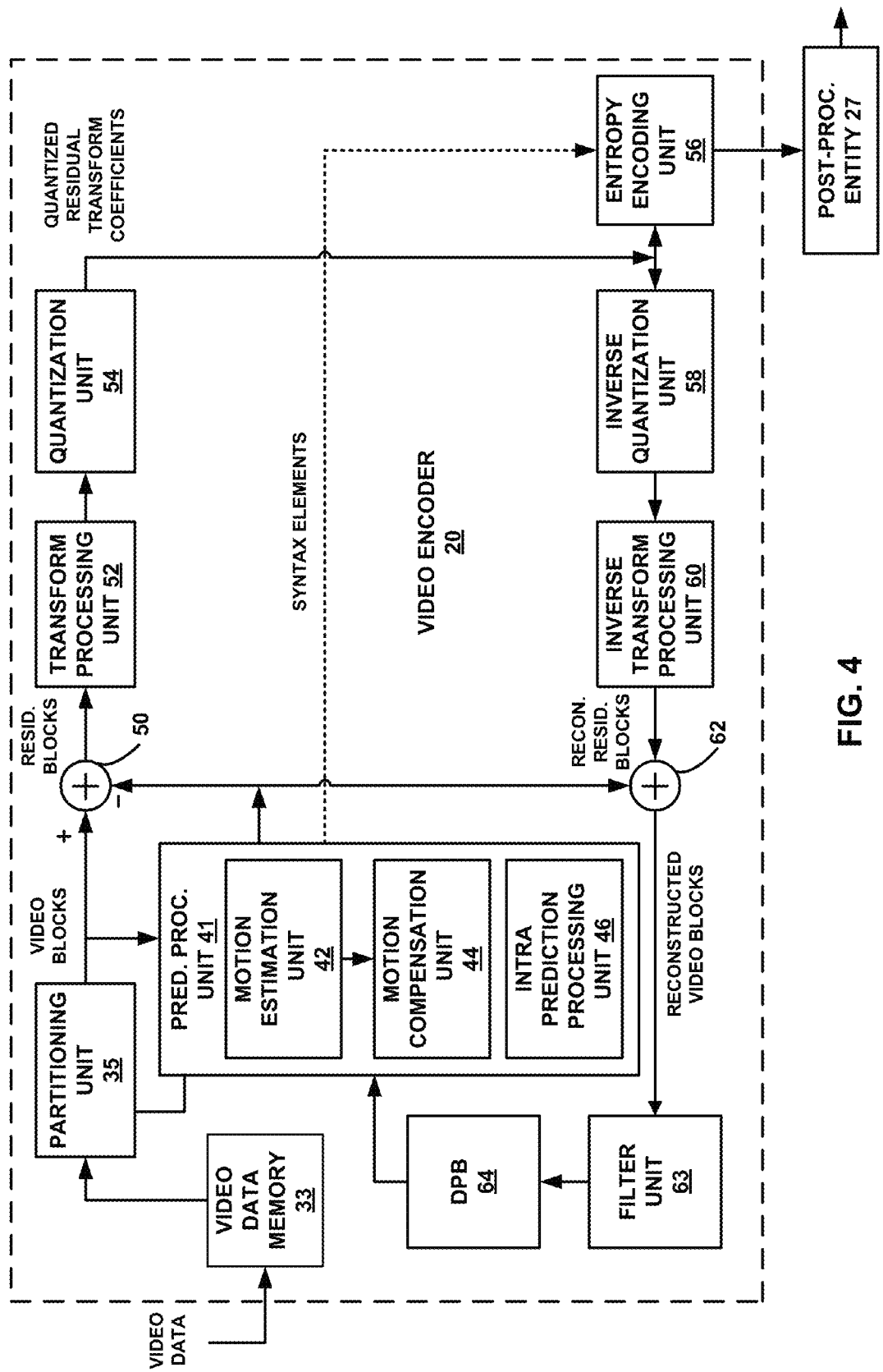
FIG. 4 is a block diagram illustrating an example video encoder that may implement the techniques described in this disclosure.

FIG. 4 is a block diagram illustrating an example video encoder 20 that may implement the techniques described in this disclosure. FIG. 4 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods Video encoder 20 may be configured to output video to post-processing entity 27, which is another example device that may implement the techniques described in this disclosure. Post-processing entity 27 is intended to represent an example of a video entity, such as a media aware network element (MANE), a splicing/editing device or another intermediate device that may process encoded video data from video encoder 20. In some instances, post-processing entity 27 may be an example of a network entity. In some video encoding systems, post-processing entity 27 and video encoder 20 may be parts of separate devices, while in other instances, the functionality described with respect to post-processing entity 27 may be performed by the same device that comprises video encoder 20.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 4, video encoder 20 includes video data memory 33, a partitioning unit 35, prediction processing unit 41, filter unit 63, decoded picture buffer (DPB) 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, video encoder 20 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 4 as being an in loop filter, in other configurations, filter unit 63 may be implemented as a post loop filter.

As shown in FIG. 4, video encoder 20 receives video data and stores the received video data in video data memory 33. Video data memory 33 may store video data to be encoded by the components of video encoder 20. The video data stored in video data memory 33 may be obtained, for example, from video source 18. DPB 64 may be a reference picture memory that stores reference video data for use in encoding video data by video encoder 20, e.g., in intra- or inter-coding modes. Video data memory 33 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

As shown in FIG. 4, video encoder 20 receives video data, and partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via either inter-prediction or intra-prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in DPB 64. The reference block may be used by motion estimation unit 42 and motion compensation unit 44 as a reference block to inter-predict a block in a subsequent video frame or picture.

According to aspects of this disclosure, video encoder 20 may be configured to generate a number of syntax elements, such as the syntax elements associated with SEI messages described above, including SEI messages for multi-layer codecs. For example, video encoder 20 may be configured to generate syntax elements according to the techniques described in this disclosure. In some instances, video encoder 20 may encode such syntax elements using entropy encoding unit 56 or another unit responsible for encoding data and generating an encoded bitstream. Furthermore, post-processing entity 27 of FIG. 4 is another example device that may implement some of the techniques described in this disclosure with respect to SEI messages, including SEI messages for multi-layer codecs.

Video encoder 20 may be further configured to determine if the first access unit is a POC resetting accessing unit and include, in the first access unit, the recovery point SEI message that applies to at least the layer and the reference layer further in response to the first access unit being the POC resetting access unit. Video encoder 20 may be further configured to determine if the first access unit comprises one or more pictures comprising information for determining a POC MSB value and include, in the first access unit, the recovery point SEI message that applies to at least the layer and the reference layer is further in response to the first access unit comprising the one or more pictures comprising the POC MSB value.

Video encoder 20 may be further configured to determining if there exists a picture in an access unit subsequent, in decoding order, to the first access unit that precedes, in decoding order, a first of a second access unit, a third access unit, and a fourth access unit, wherein the second access unit contains all IDR pictures or BLA pictures, wherein the third access unit is the start of a POC resetting period, and wherein the fourth access unit contains an IRAP picture in the base layer and at least one non-output cross layer random access picture, and include in the first access unit, the recovery point SEI message that applies to at least the layer and the reference layer of the layer is further in response to determining that there exists no picture in a subsequent access unit that precedes, in decoding order, the first of the second access unit, the third access unit, and the fourth access unit.

Video encoder 20 may be further configured to determine if there exists a picture that belongs to one of a second access unit or a third access unit, wherein the one of the second access unit and the third access units precedes, in decoding order, a fourth access unit, wherein the second access unit is an initial access unit follows, in decoding order, the first access unit and contains all IDR pictures or BLA pictures, wherein the third access unit is an initial access unit that follows, in decoding order, the first access unit and is the start of a POC resetting period, and wherein the fourth access unit is an initial access unit that follows, in decoding order, the first access unit and contains an IRAP picture in the base layer and at least one non-output cross layer random access picture, wherein including in the first access unit, the recovery point SEI message that applies to at least the layer and the reference layer of the layer is further in response to determining that there exists no picture that belongs to one of the second access unit or the third access unit.

Figure 5:
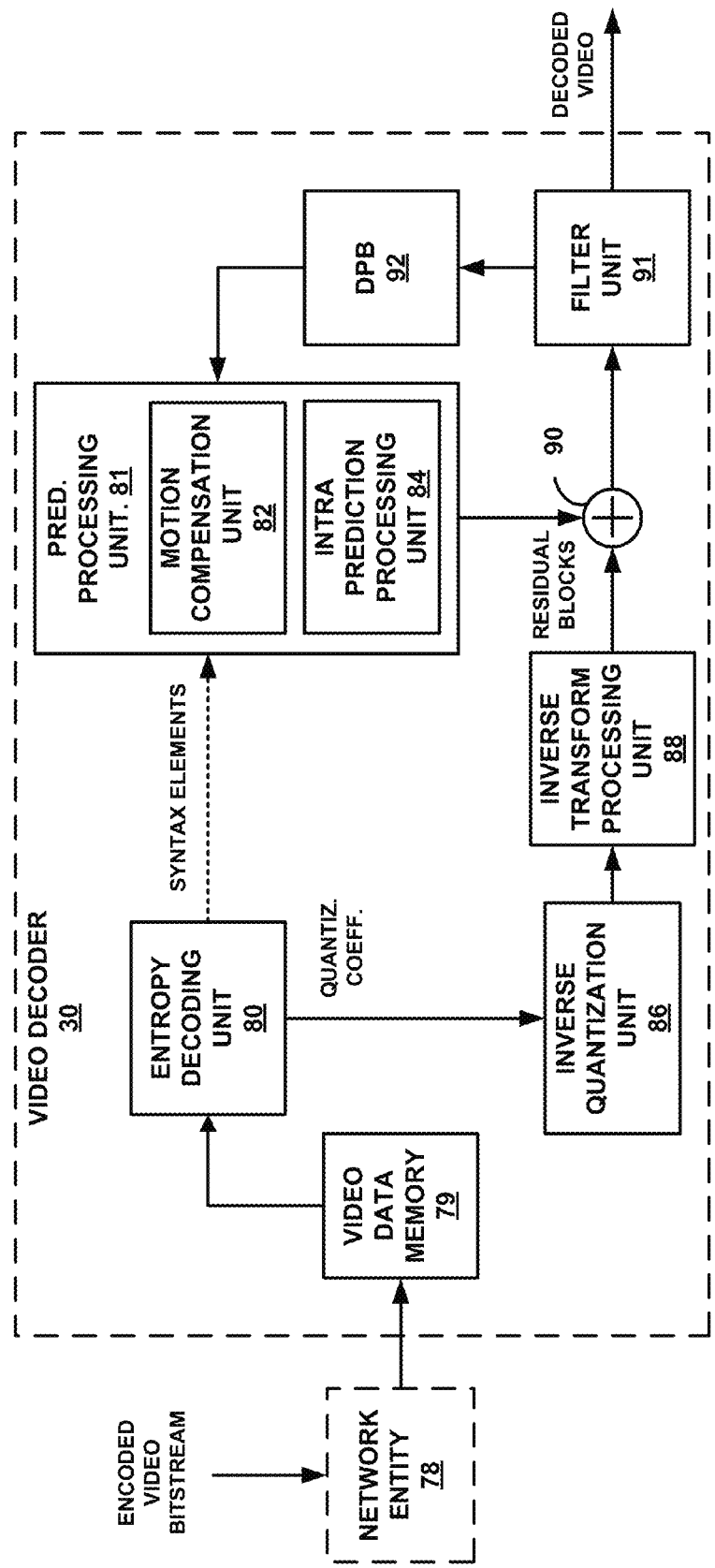
FIG. 5 is a block diagram illustrating an example video decoder that may implement the techniques described in this disclosure.

FIG. 5 is a block diagram illustrating an example video decoder 30 that may implement the techniques described in this disclosure. FIG. 5 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 5, video decoder 30 includes video data memory 79, an entropy decoding unit 80, prediction processing unit 81, inverse quantization unit 86, inverse transformation processing unit 88, summer 90, filter unit 91, and decoded picture buffer (DPB) 92. Prediction processing unit 81 includes motion compensation unit 82 and intra-prediction processing unit 84. Video decoder 30 may, in some examples, perform a decoding pass generally reciprocal to the encoding pass described with respect to video encoder 20 from FIG. 4.

During the decoding process, video decoder 30 receives an encoded video bitstream that represents video blocks of an encoded video slice and associated syntax elements from video encoder 20. Video decoder 30 may receive the encoded video bitstream from network entity 78. Network entity 78 may, for example, be a server, a MANE, a video editor/splicer, or other such device configured to implement one or more of the techniques described above. Network entity 78 may or may not include a video encoder, such as video encoder 20. Some of the techniques described in this disclosure may be implemented by network entity 78 prior to network entity 78 transmitting the encoded video bitstream to video decoder 30. In some video decoding systems, network entity 78 and video decoder 30 may be parts of separate devices, while in other instances, the functionality described with respect to network entity 78 may be performed by the same device that comprises video decoder 30.

During the decoding process, video decoder 30 receives an encoded video bitstream that represents video blocks of an encoded video slice and associated syntax elements from video encoder 20. Video decoder 30 stores the received encoded video bitstream in video data memory 79. Video data memory 79 may store video data, such as an encoded video bitstream, to be decoded by the components of video decoder 30. The video data stored in video data memory 79 may be obtained, for example, via link 16, from storage device 26, or from a local video source, such as a camera, or by accessing physical data storage media. Video data memory 79 may form a coded picture buffer (CPB) that stores encoded video data from an encoded video bitstream. DPB 93 may be a reference picture memory that stores reference video data for use in decoding video data by video decoder 30, e.g., in intra- or inter-coding modes. Video data memory 79 and DPB 92 may be formed by any of a variety of memory devices, such as DRAM, SDRAM, MRAM, RRAM, or other types of memory devices. Video data memory 79 and DPB 92 may be provided by the same memory device or separate memory devices. In various examples, video data memory 79 may be on-chip with other components of video decoder 30, or off-chip relative to those components.

Entropy decoding unit 80 of video decoder 30 entropy decodes the bitstream, stored in video data memory 79, to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra-prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or otherwise improve the video quality.

Filter unit 91 is intended to represent one or more loop filters such as a deblocking filter, an adaptive loop filter (ALF), and a sample adaptive offset (SAO) filter. Although filter unit 91 is shown in FIG. 5 as being an in loop filter, in other configurations, filter unit 91 may be implemented as a post loop filter. The decoded video blocks in a given frame or picture are then stored in DPB 92, which stores reference pictures used for subsequent motion compensation. DPB 92 also stores decoded video for later presentation on a display device, such as display device 31 of FIG. 1.

According to aspects of this disclosure, video decoder 30 may be configured to parse and decode a number of syntax elements, such as the syntax elements associated with SEI messages described above, including SEI messages for multi-layer codecs. In some instances, video decoder 30 may decode such syntax elements using entropy decoding unit 80 or another unit responsible for decoding data from an encoded bitstream. Furthermore, network entity 78 of FIG. 5 (which may be a media aware network element) is another example device that may implement the techniques described in this disclosure with respect to SEI messages, including SEI messages for multi-layer codecs.

Figure 6:
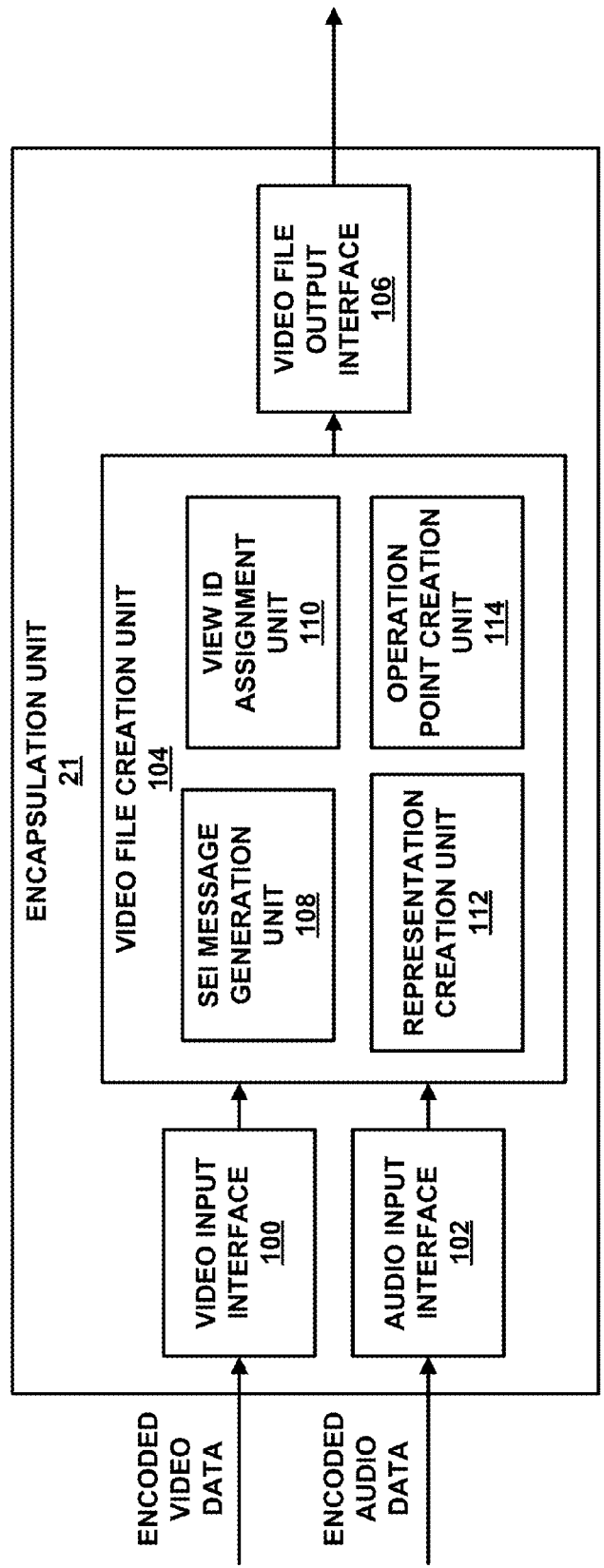
FIG. 6 is a block diagram illustrating one example of an encapsulation unit in which one or more aspects of this disclosure could be implemented.

FIG. 6 is a block diagram illustrating encapsulation unit 21 in more detail. In the example of FIG. 6, encapsulation unit 21 includes a video input interface 100, an audio input interface 102, a video file creation unit 104, and a video file output interface 106. Video file creation unit 104, in this example, includes an SEI message generation unit 108, a view identifier (ID) assignment unit 110, a representation creation unit 112, and an operation point creation unit 114.

Video input interface 100 and audio input interface 102 receive encoded video and audio data, respectively. While not shown in the example of FIG. 1, source device 12 may also include an audio source and audio encoder to generate audio data and encode audio data, respectively. Encapsulation unit 21 may then encapsulate the encoded audio data and the encoded video data to form a video file. Video input interface 100 and audio input interface 102 may receive encoded video and audio data as the data is encoded, or may retrieve encoded video and audio data from a computer-readable medium. Upon receiving encoded video and audio data, video input interface 100 and audio input interface 102 pass the encoded video and audio data to video file creation unit 104 for assembly into a video file.

Video file creation unit 104 may correspond to a control unit including hardware, software, and/or firmware configured to perform the functions and procedures attributed thereto. The control unit may further perform the functions attributed to encapsulation unit 21 generally. For examples in which video file creation unit 104 is embodied in software and/or firmware, encapsulation unit 21 may include a computer-readable medium comprising instructions for video file creation unit 104 and a processing unit to execute the instructions. Each of the sub-units of video file creation unit 104 (SEI message generation unit 108, view ID assignment unit 110, representation creation unit 112, and operation point creation unit 114, in this example) may be implemented as individual hardware units and/or software modules, and may be functionally integrated or further separated into additional sub-units.

Video file creation unit 104 may correspond to any suitable processing unit or processing circuitry, such as, for example, one or more microprocessors, application-specific integrated circuits (ASICs), field programmable gate arrays (FPGAs), digital signal processors (DSPs), or any combination thereof. Video file creation unit 104 may further include a non-transitory computer-readable medium storing instructions for any or all of SEI message generation unit 108, view ID assignment unit 110, representation creation unit 112, and operation point creation unit 114, as well as a processor for executing the instructions.

In general, video file creation unit 104 may create one or more video files including the received audio and video data. Video file creation unit 104 may construct a media presentation description (MPD) for multimedia content including two or more views. In other examples, video file creation unit 104 may create a manifest storing data similar to that of the MPD for the multimedia content.

SEI message generation unit 108 may represent a unit that generates SEI messages. SEI message generation unit 108 may, in accordance with the techniques described in this disclosure, be configured to generate a number of syntax elements, such as the syntax elements associated with SEI messages described above, including SEI messages for multi-layer codecs.

View ID assignment unit 110 may assign view identifiers to each of the views of the multimedia content. Representation creation unit 112 may construct one or more representations for the multimedia content, each of which may include one or more of the views for the multimedia content. In some examples, view ID assignment unit 110 may include data in the MPD and/or the representations (e.g., header data for the representations) indicating a maximum and a minimum of the view identifiers for views included in the representations. In addition, representation creation unit 112 may provide information in the MPD that indicates whether larger view IDs correspond to views having camera perspectives to the right or to the left of camera perspectives for views having smaller view IDs.

In some examples, the same layer may be encoded using various encoding characteristics, such as different frame rates, different bit rates, different encoding schemes, or other differences. Representation creation unit 112 may ensure that each layer included in a common representation is encoded according to the same encoding characteristics. In this manner, the MPD and/or header data for the representation may signal a set of characteristics (or attributes) for the representation that applies to all layers in the representation. Moreover, representation creation unit 112 may create multiple representations including the same layers, albeit with potentially different encoding characteristics. In some examples, representation creation unit 112 may encapsulate each layer of multimedia content in individual representations. In such examples, to output more than one layer, destination device 14 may request two or more representations of the multimedia content.

Operation point creation unit 114 may create operation points for one or more representations of the multimedia content. In general, an operation point corresponds to a subset of views in a representation that are targeted for output, where each of the views shares a common temporal level. As one example, an operation point may be identified by a temporal_id value representing the target temporal level and a set of view_id values representing the target output views. One operation point may be associated with a bitstream subset, which consists of the target output views and all other views on which the target output views depend.

Video file output interface 106 may output the created video file. For example, video file output interface 106 may be configured to provide the created video file to output interface 22, as described above with respect to FIG. 1.

While the techniques of FIG. 6 are described with encapsulation unit 21 for purposes of example, it should be understood that similar techniques may be performed by other video processing units, such as decapsulation unit 29 (FIG. 1), video encoder 20, or video decoder 30. For example, decapsulation unit 29 may be configured to receive a multi-layer bitstream and parse/decode the above-noted syntax from the multi-layer bitstream.

Figure 7:
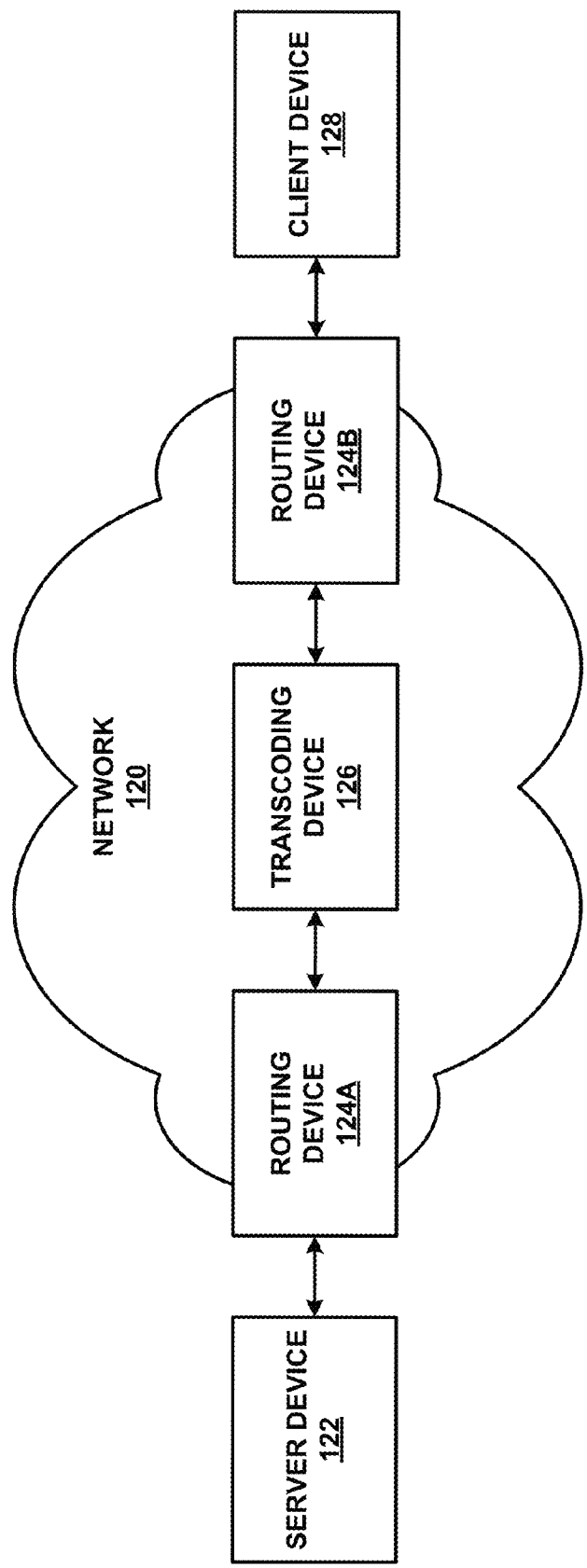
FIG. 7 is a block diagram illustrating one example network in which one or more aspects of this disclosure could be implemented.

FIG. 7 is a block diagram illustrating an example set of devices that form part of network 120. In this example, network 120 includes routing devices 124A, 124B (routing devices 124) and transcoding device 126. Routing devices 124 and transcoding device 126 are intended to represent a small number of devices that may form part of network 120. Other network devices, such as switches, hubs, gateways, firewalls, bridges, and other such devices may also be included within network 120. Moreover, additional network devices may be provided along a network path between server device 122 and client device 128. Server device 122 may correspond to source device 12 (FIG. 1), while client device 128 may correspond to destination device 14 (FIG. 1), in some examples.

In general, routing devices 124 implement one or more routing protocols to exchange network data through network 120. In some examples, routing devices 124 may be configured to perform proxy or cache operations. Therefore, in some examples, routing devices 124 may be referred to as proxy devices. In general, routing devices 124 execute routing protocols to discover routes through network 120. By executing such routing protocols, routing device 124B may discover a network route from itself to server device 122 via routing device 124A. One or more of routing devices 124 may comprise a MANE that uses one or more aspects of this disclosure.

The techniques of this disclosure may be implemented by network devices such as routing devices 124 and transcoding device 126, but also may be implemented by client device 128. In this manner, routing devices 124, transcoding device 126, and client device 128 represent examples of devices configured to perform the techniques of this disclosure. Moreover, the devices of FIG. 1, and encoder 20 illustrated in FIG. 4 and decoder 30 illustrated in FIG. 5, are also exemplary devices that can be configured to perform the techniques of this disclosure.

Aspects of how video encoder 20, video decoder 30, encapsulation unit 21, and decapsulation unit 29 may implement the techniques introduced above will now be described in greater detail. The following examples describe the implementation of several techniques introduced above.

In one example implementation, the POC MSB value of the pictures is signaled in the access unit containing the recovery point SEI message. TABLE 2 shows an example of recovery point SEI syntax in accordance with the techniques of this disclosure.

TABLE 2

|  | Descriptor |
|---|---|
| recovery_point( payloadSize ) { | |
|     recovery_poc_cnt | se(v) |
|     exact_match_flag | u(1) |
|     broken_link_flag | u(1) |
|     poc_msb_sei_val | ue(v) |
| } | |

Changes to the recovery point SEI semantics relative to existing implementations are described as follows. The recovery point SEI message assists a decoder in determining when the decoding process will produce acceptable pictures in the current layer for display after the decoder initiates random access or layer up-switching, or after the encoder indicates a broken link.

When all decoded pictures in the access units that precede the current access unit in decoding order are removed from the bitstream, the recovery point picture (defined below) and all the subsequent pictures in output order in the current layer can be correctly or approximately correctly decoded, the current picture is referred to as a layer random-accessing picture. When all the pictures that belong to the reference layers of the current layer and may be used for reference by the current picture or subsequent pictures in decoding order are correctly decoded, and the recovery point picture and all the subsequent pictures in output order in the current layer can be correctly or approximately correctly decoded when no picture prior to the current picture in decoding order in the current layer is present in the bitstream, the current picture is referred to as a layer up-switching picture.

When the recovery point SEI message applies to the current layer and all the reference layers of the current layer, the current picture is indicated as a layer random-accessing picture. When the recovery point SEI message applies to the current layer but not all the reference layers of the current layer, the current picture is indicated as a layer up-switching picture.

Decoded pictures in the current layer produced by random access or layer up-switching at or before the current access unit need not be correct in content until the indicated recovery point, and the operation of the decoding process for pictures in the current layer starting at the current picture may contain references to pictures unavailable in the decoded picture buffer.

In addition, by use of the broken_link_flag, the recovery point SEI message can indicate to the decoder the location of some pictures in the current layer in the bitstream that can result in serious visual artifacts when displayed, even when the decoding process was begun at the location of a previous IRAP access unit in decoding order that contained IRAP pictures in all layers.

NOTE 1—The broken_link_flag can be used by encoders to indicate the location of a point after which the decoding process for the decoding of some pictures in the current layer may cause references to pictures that, though available for use in the decoding process, are not the pictures that were used for reference when the bitstream was originally encoded (e.g., due to a splicing operation performed during the generation of the bitstream).

When the current picture is a layer random access-accessing picture and random access is performed to start decoding from the current access unit, the decoder operates as if the current access unit was the first access unit in the bitstream in decoding order, and the following applies:

If poc_msb_sei_val is not present, the variable PrevPicOrderCnt[nuh_layer_id] used in derivation of PicOrderCntVal for each picture in the access unit is set equal to 0.

Otherwise (poc_msb_sei_val is present), the PicOrderCnt of the current picture is derived as if poc_msb_val was present and equal to poc_msb_sei_val, and the PicOrderCnt of each of the other pictures in the current access unit is also derived as if poc_msb_val was present and equal to poc_msb_sei_val.

When the current picture is either a layer random-accessing picture or a layer up-switching picture and layer up-switching is performed to start decoding of the current layer from the current access (while decoding of the reference layers of the current layer have started earlier and pictures of those layers in the current access unit are correctly decoded), the decoder operates as if the current pictrue was the first picture of the current layer in the bitstream in decoding order, and the PicOrderCntVal of the current picture is set equal to the PicOrderCntVal of any other decoded picture in the current access unit.

NOTE 2—When hypothetical reference decoder (HRD) information is present in the bitstream, a buffering period SEI message should be associated with the access unit associated with the recovery point SEI message in order to establish initialization of the HRD buffer model after a random access.

Any SPS or PPS RBSP that is referred to by a picture of the access unit containing a recovery point SEI message or by any picture in a subsequent access unit in decoding order shall be available to the decoding process prior to its activation, regardless of whether or not the decoding process is started at the beginning of the bitstream or with the access unit, in decoding order, that contains the recovery point SEI message.

The syntax element recovery_poc_cnt specifies the recovery point of decoded pictures in the current layer in output order. If there is a picture picB in the current layer that follows the current picture picA but precedes an access unit containing an IRAP picture in the current layer in decoding order and PicOrderCnt(picB) is equal to PicOrderCnt(picA) plus the value of recovery_poc_cnt, where PicOrderCnt(picA) and PicOrderCnt(picB) are the PicOrderCntVal values of picA and picB, respectively, immediately after the invocation of the decoding process for picture order count for picB, the picture picB is referred to as the recovery point picture. Otherwise, the first picture picC in the current layer in output order for which PicOrderCnt(picC) is greater than PicOrderCnt(picA) plus the value of recovery_poc_cnt is referred to as the recovery point picture, where PicOrderCnt(picA) and PicOrderCnt(picC) are the PicOrderCntVal values of picA and picC, respectively, immediately after the invocation of the decoding process for picture order count for picC. The recovery point picture shall not precede the current picture in decoding order. All decoded pictures in the current layer in output order are indicated to be correct or approximately correct in content starting at the output order position of the recovery point picture. The value of recovery_poc_cnt shall be in the range of $-\text{MaxPicOrderCntLsb}/2$ to $\text{MaxPicOrderCntLsb}/2-1$, inclusive.

The syntax element exact_match_flag indicates whether decoded pictures in the current layer at and subsequent to the specified recovery point in output order derived by starting the decoding process at the access unit containing the recovery point SEI message will be an exact match to the pictures in the current layer that would be produced by starting the decoding process at the location of a previous access unit where the picture of the layer in the current layer and the pictures of all the direct and indirect reference layers are IRAP pictures, if any, in the bitstream. The value 0 indicates that the match may not be exact and the value 1 indicates that the match will be exact. When exact_match_flag is equal to 1, it is a requirement of bitstream conformance that the decoded pictures in the current layer at and subsequent to the specified recovery point in output order derived by starting the decoding process at the access unit containing the recovery point SEI message shall be an exact match to the pictures in the current layer that would be produced by starting the decoding process at the location of a previous access unit where the picture of the layer in the current layer and the pictures of all the direct and indirect reference layers are IRAP pictures, if any, in the bitstream.

NOTE 3—When performing random access, decoders should infer all references to unavailable pictures as references to pictures containing only intra coding blocks and having sample values given by Y equal to $(1<<(BitDepth_Y-1))$, Cb and Cr both equal to $(1<<(BitDepth_C-1))$ (mid-level grey), regardless of the value of exact_match_flag.

When exact_match_flag is equal to 0, the quality of the approximation at the recovery point is chosen by the encoding process and is not specified.

The syntax element broken_link_flag indicates the presence or absence of a broken link in the layer in the current layer at the location of the recovery point SEI message and is assigned further semantics as follows:

If broken_link_flag is equal to 1, pictures in the current layer produced by starting the decoding process at the location of a previous access unit where the picture of the layer in the current layer and the pictures of all the direct and indirect reference layers are IRAP pictures may contain undesirable visual artifacts to the extent that decoded pictures in the current layer at and subsequent to the access unit containing the recovery point SEI message in decoding order should not be displayed until the specified recovery point in output order.

Otherwise (broken_link_flag is equal to 0), no indication is given regarding any potential presence of visual artifacts.

When the current picture is a BLA picture, the value of broken_link_flag shall be equal to 1.

Regardless of the value of the broken_link_flag, pictures in the current layer subsequent to the specified recovery point in output order are specified to be correct or approximately correct in content.

The syntax element poc_msb_sei_val indicates the value of the most significant bits of the picture order count value of pictures in the current access unit. The value of poc_msb_sei_val shall be in the range of 0 to $2^{32-log2\_max\_order\_cnt\_lsb\_minus4-4}$, inclusive. When not present, the value of poc_msb_sei_val is inferred to be equal to 0.

In another example implementation, the POC MSB value may not be signaled in the SEI message but one or more constraints may be added such that the recovery point SEI message is disallowed to be present in access units where the POC MSB is not signaled for pictures in layers to which the SEI message applies and the decoding process of pictures starting at the access unit could lead to incorrect reference pictures or incorrect decrement of POC.

The constraint added to the semantics of the recovery point SEI message is given below.

When both of the following conditions are true for a particular access unit auA and a particular layer layerA, auA shall not contain a recovery point SEI message that applies to a set of layers containing at least layerA and all reference layers of layerA, where auB is the first access unit, when present, that follows auA in decoding order and contains pictures that all are IDR pictures or BLA pictures, auC is the first access unit, when present, that follows auA in decoding order and is the start of a POC resetting period, and auD is the first access unit, when present, that follows auA in decoding order and contains an IRAP picture in the base layer with NoClrasOutputFlag equal to 1:

All pictures in auA that are in the reference layers, if any, of layerA have both poc_msb_val_present_flag and poc_reset_idc equal to 0.

There is at least one picture picA with poc_msb_val_present_flag equal to 1 that follows auA in decoding order and one of the following conditions is true:

picA precedes, in decoding order, the first of auB (when present), auC (when present), and auD (when present) in decoding order.

picA belongs to auB or auC when the first of auB (when present), auC (when present), and auD (when present) in decoding order is auB or auC, respectively.

None of auB, auC, and auD exists in the bitstream.

In one example, the following paragraph:

When the current picture is a layer random access-accessing picture and random access is performed to start decoding from the current access unit, the decoder operates as if the current access unit was the first access unit in the bitstream in decoding order, and the following applies:

If poc_msb_sei_val is not present, the variable PrevPicOrderCnt[nuh_layer_id] used in derivation of PicOrderCntVal for each picture in the access unit is set equal to 0.

Otherwise (poc_msb_sei_val is present), the PicOrderCnt of the current picture is derived as if poc_msb_val was present and equal to poc_msb_sei_val, and the PicOrderCnt of each of the other pictures in the current access unit is also is derived as if poc_msb_val was present and equal to poc_msb_sei_val.

is replaced by:

When the current picture is a layer random-accessing picture and random access is performed to start decoding from the current access unit, the decoder operates as if the current access unit was the first access unit in the bitstream in decoding order, and the variable PrevPicOrderCnt[nuh_layer_id] used in derivation of PicOrderCntVal for each picture in the access unit is set equal to 0.

Figure 8:
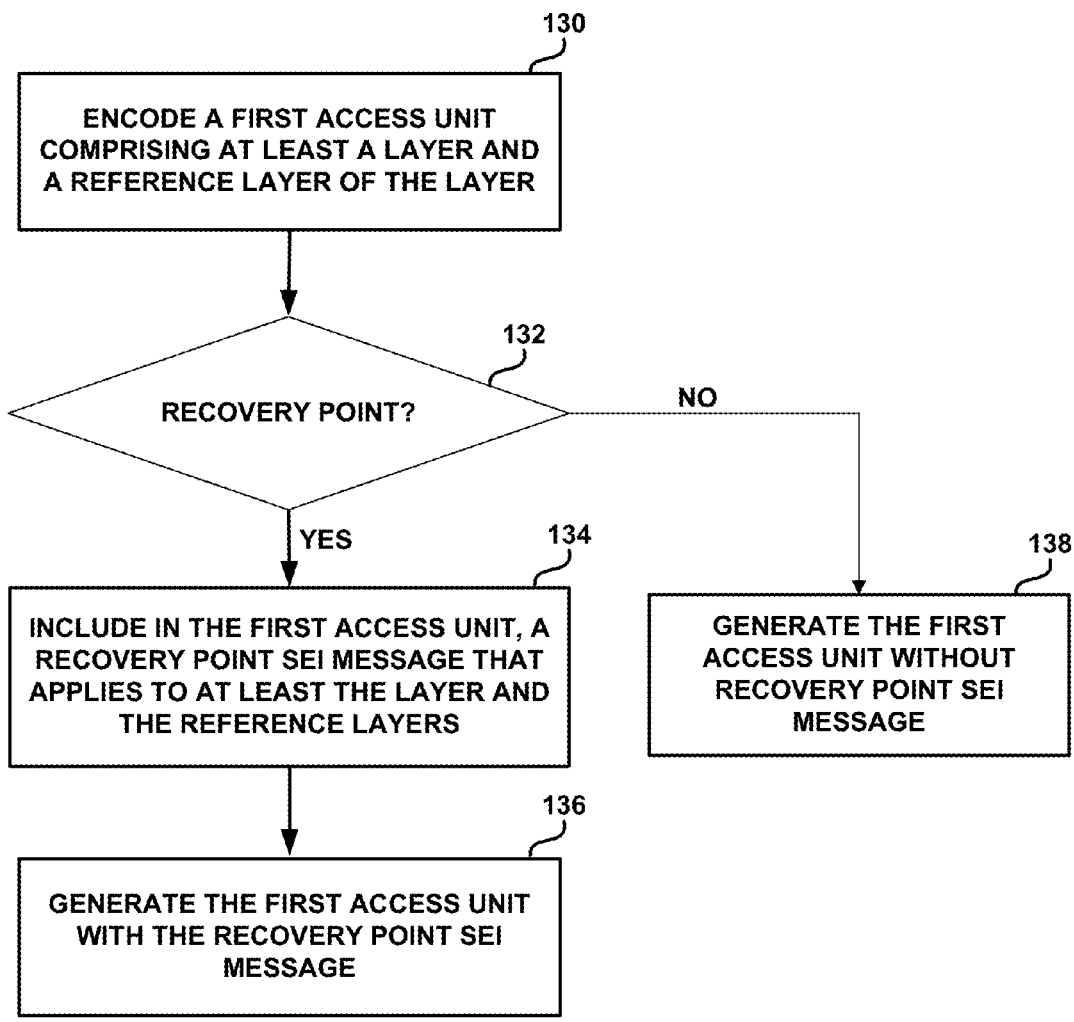
FIG. 8 is a flowchart illustrating techniques of this disclosure.

FIG. 8 is a flowchart showing a method of encoding multi-layer video data in accordance with the techniques of this disclosure. The techniques of FIG. 8 will be described with respect to video encoder 20 described above. Video encoder encodes a first access unit comprising at least a layer and a reference layer of the layer (130). Video encoder 20 determines if the first access unit is a recovery point (132). In response to the first access unit being a recovery point (132, YES), video encoder 20 includes in the first access unit, a recovery point SEI message that applies to at least the layer and the reference layers (134) and generates the first access unit with the SEI recovery point message (136). In response to the first access unit not being a recovery point (132, NO), video encoder 20 generates the first access unit without the recovery point SEI message (138).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
   encoding a first access unit comprising at least a first layer and a reference layer of the first layer;
   determining that the first access unit is a not a picture order count (POC) resetting access unit;
   determining that the first access unit does not comprises one or more pictures comprising signaled POC most significant bits (MSB) information;
   in response to the first access unit not being a POC resetting access unit and in response to the first access unit not comprising the one or more pictures comprising the POC MSB information, determining that the first access unit meets a condition;
   in response to the first access unit meeting the condition, including in the first access unit, a recovery point supplemental enhancement information (SEI) message that applies to at least the first layer and the reference layer of the first layer; and
   generating the first access unit with the recovery point SEI message.

2. The method of claim 1, further comprising:
   encoding a second access unit comprising at least a second layer and a reference layer of the second layer;
   determining that the second access unit is a POC resetting accessing unit; and
   including in the second access unit, a second recovery point SEI message that applies to at least the second layer and the reference layer of the second layer in response to the second access unit being the POC resetting access unit.

3. The method of claim 1, further comprising:
   encoding a second access unit comprising at least a second layer and a reference layer of the second layer;
   determining that the second access unit comprises one or more pictures comprising signaled POC most significant bits (MSB) information; and
   including, in the second access unit, a second recovery point SEI message that applies to at least the second layer and the reference layer of the second layer in response to the second access unit comprising the one or more pictures comprising the POC MSB information.

4. The method of claim 1, further comprising:
   determining if there exists a picture in an access unit subsequent, in decoding order, to the first access unit that precedes, in decoding order, a first of a second access unit, a third access unit, and a fourth access unit, wherein the second access unit contains all instantaneous decoding refresh (IDR) pictures or broken link access (BLA) pictures, wherein the third access unit is the start of a POC resetting period, and wherein the fourth access unit contains an intra random access point (TRAP) picture in the base layer and at least one non-output cross layer random access picture, wherein including in the first access unit, the recovery point SEI message that applies to at least the first layer and the reference layer of the first layer is further in response to determining that there exists no picture in a subsequent access unit that precedes, in decoding order, the first of the second access unit, the third access unit, and the fourth access unit.

5. The method of claim 1, further comprising:
   determining if there exists a picture that belongs to one of a second access unit or a third access unit, wherein the one of the second access unit and the third access units precedes, in decoding order, a fourth access unit, wherein the second access unit is an initial access unit that follows, in decoding order, the first access unit and contains all instantaneous decoding refresh (IDR) pictures or broken link access (BLA) pictures, wherein the third access unit is an initial access unit that follows, in decoding order, the first access unit and is the start of a POC resetting period, and wherein the fourth access unit is an initial access unit that follows, in decoding order, the first access unit and contains an intra random access point (TRAP) picture in the base layer and at least one non-output cross layer random access picture, wherein including in the first access unit, the recovery point SEI message that applies to at least the first layer and the reference layer of the first layer is further in response to determining that there exists no picture that belongs to one of the second access unit or the third access unit.

6. The method of claim 1,
wherein the condition comprises there exists no picture that satisfies any of the following conditions: (1) the picture precedes, in decoding order, a first of a second access unit, a third access unit, and a fourth access unit, (2) the picture belongs to the second access unit or the third access unit when a first, in decoding order, of the second access unit, the third access unit, and the fourth access unit is either the second access unit or the third access unit, or (3) none of the second access unit, the third access unit, or the fourth access unit exists in the bitstream,
wherein the second access unit is an initial access unit that follows the first access unit in decoding order and contains pictures that all are IDR pictures or BLA pictures, the third access unit is an initial access unit that follows the first access unit in decoding order and is the start of a POC resetting period, and the fourth access unit is an initial access unit that follows the first access unit in decoding order and contains an IRAP picture in a base layer with at least one non-output cross layer random access picture.

7. A device for video encoding multi-layer video data, the device comprising:
a memory configured to store at least a portion of a multi-layer bitstream of video data; and
one or more processors configured to:
encode a first access unit comprising at least a first layer and a reference layer of the first layer;
determine if the first access unit is a picture order count (POC) resetting access unit;
determine if the first access unit comprises one or more pictures comprising signaled POC most significant bits (MSB) information;
in response to the first access unit not being a POC resetting access unit and in response to the first access unit not comprising the one or more pictures comprising the POC MSB information, determine if the first access unit meets a condition;
in response to the first access unit meeting the condition, include in the first access unit, a recovery point supplemental enhancement information (SEI) message that applies to at least the first layer and the reference layer of the first layer; and
generate the first access unit with the recovery point SEI message.

8. The device of claim 7, wherein the one or more processors are further configured to:
encode a second access unit comprising at least a second layer and a reference layer of the second layer;
determine if the second access unit is a POC resetting accessing unit and
include in the second access unit, a second recovery point SEI message that applies to at least the second layer and the reference layer of the second layer in response to the second access unit being the POC resetting access unit.

9. The device of claim 7, wherein the one or more processors are further configured to:
encode a second access unit comprising at least a second layer and a reference layer of the second layer;

determine if the second access unit comprises one or more pictures comprising signaled POC most significant bits (MSB) information; and
include, in the second access unit, a second recovery point SEI message that applies to at least the second layer and the reference layer of the second layer in response to the second access unit comprising the one or more pictures comprising the POC MSB information.

10. The device of claim 7, wherein the one or more processors are further configured to:
determine if there exists a picture in an access unit subsequent, in decoding order, to the first access unit that precedes, in decoding order, a first of a second access unit, a third access unit, and a fourth access unit, wherein the second access unit contains all instantaneous decoding refresh (IDR) pictures or broken link access (BLA) pictures, wherein the third access unit is the start of a POC resetting period, and wherein the fourth access unit contains an intra random access point (TRAP) picture in the base layer and at least one non-output cross layer random access picture; and
include in the first access unit, the recovery point SEI message that applies to at least the first layer and the reference layer of the first layer further in response to determining that there exists no picture in a subsequent access unit that precedes, in decoding order, the first of the second access unit, the third access unit, and the fourth access unit.

11. The device of claim 7, wherein the one or more processors are further configured to:
determine if there exists a picture that belongs to one of a second access unit or a third access unit, wherein the one of the second access unit and the third access units precedes, in decoding order, a fourth access unit, wherein the second access unit is an initial access unit that follows, in decoding order, the first access unit and contains all instantaneous decoding refresh (IDR) pictures or broken link access (BLA) pictures, wherein the third access unit is an initial access unit that follows, in decoding order, the first access unit and is the start of a POC resetting period, and wherein the fourth access unit is an initial access unit that follows, in decoding order, the first access unit and contains an intra random access point (TRAP) picture in the base layer and at least one non-output cross layer random access picture; and
include in the first access unit, the recovery point SEI message that applies to at least the first layer and the reference layer of the first layer further in response to determining that there exists no picture that belongs to one of the second access unit or the third access unit.

12. The device of claim 7, wherein the
the condition comprises there exists no picture that satisfies any of the following conditions: (1) the picture precedes, in decoding order, a first of a second access unit, a third access unit, and a fourth access unit, (2) the picture belongs to the second access unit or the third access unit when a first, in decoding order, of the second access unit, the third access unit, and the fourth access unit is either the second access unit or the third access unit, or (3) none of the second access unit, the third access unit, or the fourth access unit exists in the bitstream,
wherein the second access unit is an initial access unit that follows the first access unit in decoding order and contains pictures that all are IDR pictures or BLA pictures, the third access unit is an initial access unit that follows the first access unit in decoding order and is the start of a POC resetting period, and the fourth access unit is an initial access unit that follows the first access unit in decoding order and contains an IRAP picture in a base layer with at least one non-output cross layer random access picture.

13. A non-transitory computer readable storage medium storing instructions that when executed by one or more processors cause the one or more processor to:
encode a first access unit comprising at least a first layer and a reference layer of the first layer;
determine if the first access unit is a picture order count (POC) resetting access unit;
determine if the first access unit comprises one or more pictures comprising signaled POC most significant bits (MSB) information;
in response to the first access unit not being a POC resetting access unit and in response to the first access unit not comprising the one or more pictures comprising the POC MSB information, determine if the first access unit meets a condition;
in response to the first access unit meeting the condition, include in the first access unit, a recovery point supplemental enhancement information (SEI) message that applies to at least the first layer and the reference layer of the first layer; and
generate the first access unit with the recovery point SEI message.

14. The non-transitory computer readable claim 13, further storing instructions that when executed by the one or more processors cause the one or more processors to:
encode a second access unit comprising at least a second layer and a reference layer of the second layer;
determine if the second access unit is a POC resetting accessing unit; and
include in the second access unit, a second recovery point SEI message that applies to at least the second layer and the reference layer of the second layer in response to the second access unit being the POC resetting access unit.

15. The non-transitory computer readable claim 13, further storing instructions that when executed by the one or more processors cause the one or more processors to:
encode a second access unit comprising at least a second layer and a reference layer of the second layer;
determine if the second access unit comprises one or more pictures comprising signaled POC most significant bits (MSB) information; and
include, in the second access unit, a second recovery point SEI message that applies to at least the second layer and the reference layer of the second layer in response to the second access unit comprising the one or more pictures comprising the POC MSB information.

16. The non-transitory computer readable claim 13, further storing instructions that when executed by the one or more processors cause the one or more processors to:
determine if there exists a picture in an access unit subsequent, in decoding order, to the first access unit that precedes, in decoding order, a first of a second access unit, a third access unit, and a fourth access unit, wherein the second access unit contains all instantaneous decoding refresh (IDR) pictures or broken link access (BLA) pictures, wherein the third access unit is the start of a POC resetting period, and wherein the fourth access unit contains an intra random access point (TRAP) picture in the base layer and at least one non-output cross layer random access picture; and include in the first access unit, the recovery point SEI message that applies to at least the first layer and the reference layer of the first layer further in response to determining that there exists no picture in a subsequent access unit that precedes, in decoding order, the first of the second access unit, the third access unit, and the fourth access unit.

17. The non-transitory computer readable claim 13, further storing instructions that when executed by the one or more processors cause the one or more processors to:
determine if there exists a picture that belongs to one of a second access unit or a third access unit, wherein the one of the second access unit and the third access units precedes, in decoding order, a fourth access unit, wherein the second access unit is an initial access unit that follows, in decoding order, the first access unit and contains all instantaneous decoding refresh (IDR) pictures or broken link access (BLA) pictures, wherein the third access unit is an initial access unit that follows, in decoding order, the first access unit and is the start of a POC resetting period, and wherein the fourth access unit is an initial access unit that follows, in decoding order, the first access unit and contains an intra random access point (TRAP) picture in the base layer and at least one non-output cross layer random access picture; and
include in the first access unit, the recovery point SEI message that applies to at least the first layer and the reference layer of the first layer further in response to determining that there exists no picture that belongs to one of the second access unit or the third access unit.

18. The non-transitory computer readable claim 13,
wherein the condition comprises there exists no picture that satisfies any of the following conditions: (1) the picture precedes, in decoding order, a first of a second access unit, a third access unit, and a fourth access unit, (2) the picture belongs to the second access unit or the third access unit when a first, in decoding order, of the second access unit, the third access unit, and the fourth access unit is either the second access unit or the third access unit, or (3) none of the second access unit, the third access unit, or the fourth access unit exists in the bitstream,
wherein the second access unit is an initial access unit that follows the first access unit in decoding order and contains pictures that all are IDR pictures or BLA pictures, the third access unit is an initial access unit that follows the first access unit in decoding order and is the start of a POC resetting period, and the fourth access unit is an initial access unit that follows the first access unit in decoding order and contains an IRAP picture in a base layer with at least one non-output cross layer random access picture.

19. An apparatus for encoding video data, the apparatus comprising:
means for encoding a first access unit comprising at least a first layer and a reference layer of the first layer;
means for determining if the first access unit is a picture order count (POC) resetting access unit;
means for determining if the first access unit comprises one or more pictures comprising signaled POC most significant bits (MSB) information;
means for determining if the first access unit meets a condition in response to the first access unit not being a POC resetting access unit and in response to the first access unit not comprising the one or more pictures comprising the POC MSB information;

means for including in the first access unit, a recovery point supplemental enhancement information (SEI) message that applies to at least the first layer and the reference layer of the first layer in response to the first access meeting the condition; and
means for generating the first access unit with the recovery point SEI message.

20. The apparatus of claim 19, further comprising:
means for encoding a second access unit comprising at least a second layer and a reference layer of the second layer;
means for determining if the second access unit is a POC resetting accessing unit; and
means for including in the second access unit, a second recovery point SEI message that applies to at least the second layer and the reference layer of the second layer in response to the second access unit being the POC resetting access unit.

21. The apparatus of claim 19, further comprising:
means for encoding a second access unit comprising at least a second layer and a reference layer of the second layer;
means for determining if the second access unit comprises one or more pictures comprising signaled POC most significant bits (MSB) information; and, wherein
means for including, in the second access unit, a second recovery point SEI message that applies to at least the second layer and the reference layer of the second layer in response to the second access unit comprising the one or more pictures comprising the POC MSB information.

22. The apparatus of claim 19, further comprising:
means for determining if there exists a picture in an access unit subsequent, in decoding order, to the first access unit that precedes, in decoding order, a first of a second access unit, a third access unit, and a fourth access unit, wherein the second access unit contains all instantaneous decoding refresh (IDR) pictures or broken link access (BLA) pictures, wherein the third access unit is the start of a POC resetting period; and wherein the fourth access unit contains an intra random access point (TRAP) picture in the base layer and at least one non-output cross layer random access picture; and
means for including in the first access unit, the recovery point SEI message that applies to at least the first layer and the reference layer of the first layer further in response to determining that there exists no picture in a subsequent access unit that precedes, in decoding order, the first of the second access unit, the third access unit, and the fourth access unit.

23. The apparatus of claim 19, further comprising:
means for determining if there exists a picture that belongs to one of a second access unit or a third access unit, wherein the one of the second access unit and the third access units precedes, in decoding order, a fourth access unit, wherein the second access unit is an initial access unit that follows, in decoding order, the first access unit and contains all instantaneous decoding refresh (IDR) pictures or broken link access (BLA) pictures, wherein the third access unit is an initial access unit that follows, in decoding order, the first access unit and is the start of a POC resetting period, and wherein the fourth access unit is an initial access unit that follows, in decoding order, the first access unit and contains an intra random access point (TRAP) picture in the base layer and at least one non-output cross layer random access picture; and
means for including in the first access unit, the recovery point SEI message that applies to at least the first layer and the reference layer of the first layer further in response to determining that there exists no picture that belongs to one of the second access unit or the third access unit.

24. The apparatus of claim 19,
wherein the condition comprises there exists no picture that satisfies any of the following conditions: (1) the picture precedes, in decoding order, a first of a second access unit, a third access unit, and a fourth access unit, (2) the picture belongs to the second access unit or the third access unit when a first, in decoding order, of the second access unit, the third access unit, and the fourth access unit is either the second access unit or the third access unit, or (3) none of the second access unit, the third access unit, or the fourth access unit exists in the bitstream,
wherein the second access unit is an initial access unit that follows the first access unit in decoding order and contains pictures that all are IDR pictures or BLA pictures, the third access unit is an initial access unit that follows the first access unit in decoding order and is the start of a POC resetting period, and the fourth access unit is an initial access unit that follows the first access unit in decoding order and contains an IRAP picture in a base layer with at least one non-output cross layer random access picture.

25. The method of claim 1, further comprising:
storing the video data in a memory of the wireless communication device;
processing the video data on one or more processors of the wireless communication device; and
transmitting the video data at a transmitter of a wireless communication device.

26. The method of claim 25, wherein the wireless communication device comprises a telephone handset and wherein transmitting the video data at the transmitter of the wireless communication device comprises modulating, according to a wireless communication standard, a signal comprising the video data.

27. The device of claim 9, wherein the device further comprises a wireless communication device comprising a transmitter configured to transmit encoded video data.

28. The device of claim 27, wherein the wireless communication device comprises a telephone handset and wherein the transmitter is configured to modulate, according to a wireless communication standard, a signal comprising the encoded video data.

* * * * *